United States Patent

[11] 3,585,315

[72] Inventor Theodore R. Shaifer
Chicago, Ill.
[21] Appl. No. 669,785
[22] Filed Sept. 22, 1967
[45] Patented June 15, 1971
[73] Assignee IIT Research Institute
Chicago, Ill.

[54] VIDEO PLAYBACK AMPLIFIER WITH FREQUENCY COMPENSATION
1 Claim, 2 Drawing Figs.

[52] U.S. Cl. .......... 179/100.2
[51] Int. Cl. .......... G11b 5/44
[50] Field of Search .......... 179/100.2
K, 100.2, 1 A; 330/28, 17, 12

[56] References Cited

OTHER REFERENCES

" Basic Theory and Application of Transistors," DEPARTMENT OF THE ARMY TECHNICAL MANUAL, March 1959, p. 113, par. 111, lines 1— 3

GENERAL ELECTRIC TRANSISTOR MANUAL, 5th Edition, 1960, p. 58, lines 2— 5.

Ridler, P. F., " Transistor Tape Pre-Amplifier," WIRELESS WORLD, Dec. 1958, pg. 572— 3.

*Primary Examiner*—Bernard Konick
*Assistant Examiner*—Robert S. Tupper
*Attorney*—Hill, Sherman, Meroni, Gross and Simpson

ABSTRACT: A video playback amplifier with frequency compensation, employing a transistor amplifier having a relatively low input impedance, for example, wherein the input transistor of said amplifier is in common-base configuration, and an inductive transducer having a relatively low impedance operatively connected to said amplifier with the impedance of the transducer differing from that of the amplifier input by an amount and in such direction that the inductive reactance of the transducer and the low input resistance of the amplifier produce a current into the amplifier which is substantially constant over at least the midvideo frequency range.

INVENTOR.
THEODORE R. SHAIFER

BY Hill, Sherman, Meroni, Gross & Simpson ATTORNEYS

VIDEO PLAYBACK AMPLIFIER WITH FREQUENCY COMPENSATION

FIELD OF THE INVENTION

The present invention relates to a transistor amplifier, and more particularly to amplifier circuits adapted to be used with a low impedance transducer head for wide-band amplification of recorded video signals.

PRIOR ART

In preamplifiers for recorded video signals it has been customary to use a first stage with a high input impedance such as a common-emitter configuration. These circuits are customarily used with a transducer head having a high impedance. The purpose of the high head impedance is to match with the amplifier and additional complicated circuitry in order to produce a flat frequency response over the wide-band of video reproduction.

The prior art approach to the problem of obtaining good low frequency response from a tape recorded signal has been, as stated, to use a head of high inductance value together with a voltage amplifier that has equalization to correct for the rising 6 decibel per octave output of the head. This approach is sound and straight forward, but unfortunately the attendant stray capacitance of the high inductance winding causes the head to resonate at frequencies that are considerably lower than desired for adequate picture detail. For example a head with a typical value of inductance of 10 millihenries requires that the total capacity be less than 0.7 picofarads if the resonance is to occur at 2 MegaHertz or above. This value of capacity is practically impossible to achieve because of lead length capacity and amplifier input capacity in addition to the winding stray capacity.

SUMMARY

In accordance with the present invention, I have provided a video playback amplifier responsive to signals from a low impedance transducer head to a common-base first transistor amplification stage.

Accordingly, it is an object of the present invention to provide a new and improved wide-band transistor amplifier circuit having a substantially flat response.

Another object of the present invention is to provide a novel video playback amplifier having low input impedance matched to a low impedance transducer head.

A further object of the present invention is to provide a wide-band amplifier of general utility.

Yet another object of this invention is to provide a video playback amplifier providing substantially flat or uniform response over the entire frequency range.

Yet a further object of this invention is to provide a video playback amplifier providing substantially flat frequency response with a minimum number of components and consequent cost reduction.

Many other advantages, features and additional object of the present invention will become manifest to those versed in the art upon making reference to the detailed description and the accompanying sheet of drawings in which a preferred structural embodiment incorporating the principles of the present invention is shown by way of illustrative example.

AS SHOWN ON THE DRAWINGS

Figures 1, 2:
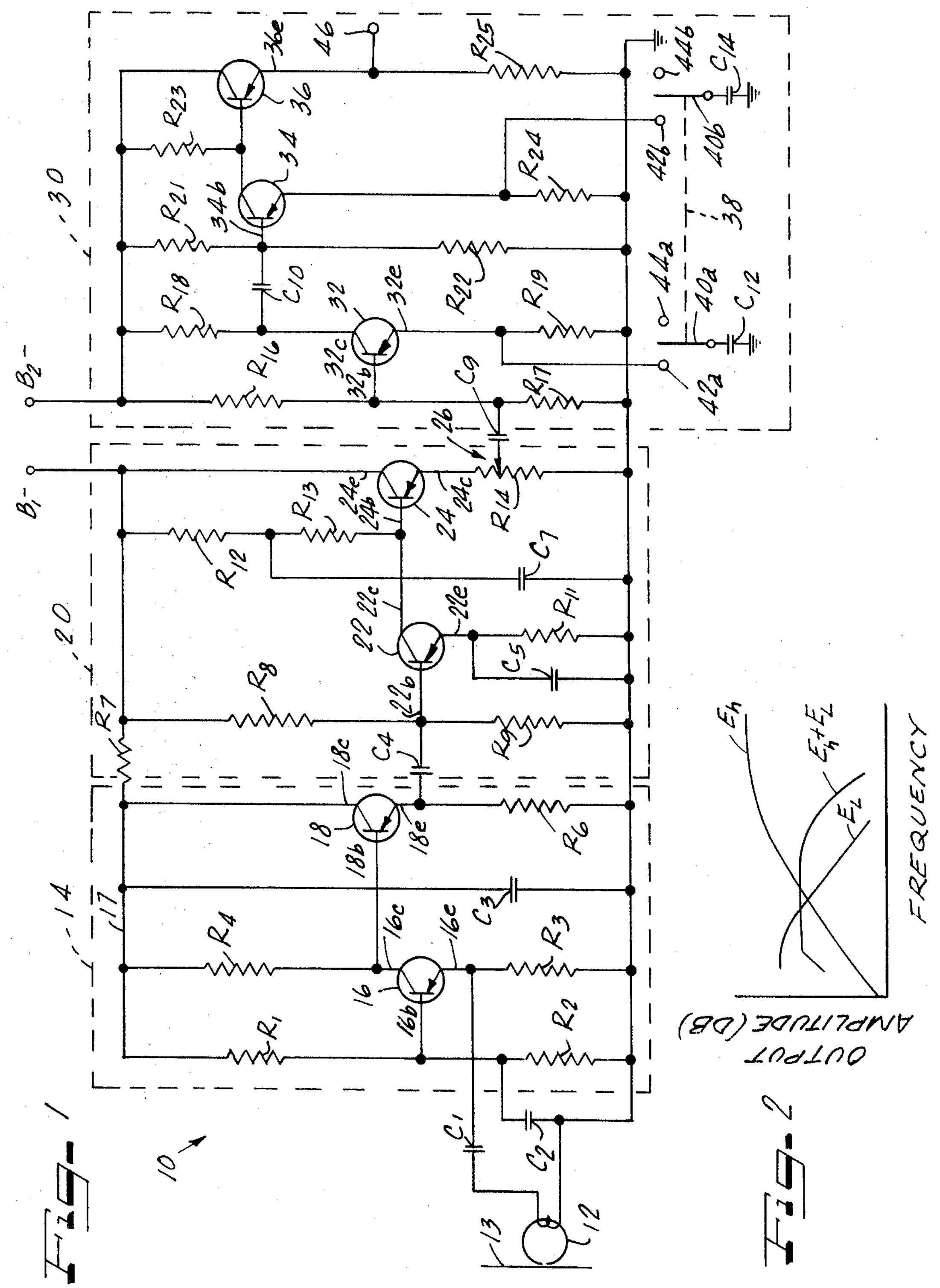
FIG. 1 is a schematic illustration of a video playback amplifier constructed in accordance with this invention.
FIG. 2 is a graph showing the output versus frequency of the circuit of the invention.

The principles of this invention are particularly useful when embodied in a video playback amplifier as illustrated in FIG. 1, generally indicated by the numeral 10.

In accordance with the invention a magnetic transducer head 12 is a source of wide-band video frequency signals from a magnetic medium such as a tape 13, which passes in proximity thereto. The signals from the magnetic head 12 are fed to a low impedance preamplifier 14 comprising a pair of PNP transistor stages 16, 18.

The signals from the head 12 are passed through a coupling capacitor C1 to the transistor stage 16 to provide wide-band amplification of the signals. The transistor 16 is in a common-base configuration. The capacitor C1 is coupled between the head 12 and the emitter **16*e*. A voltage divider is formed by a pair of resistors R1, R2 for biasing the base 16*b* which is connected at the juncture of the resistor R1 and R2. The other ends of the resistors are connected to a B− supply line 17 and to ground, respectively. A capacitor C2 is connected in parallel with R2 for the purpose of maintaining the base 16*b*** at AC ground potential.

The transistor base **18*b* is directly connected to the output collector 16*c*. A capacitor C3 is connected between the B− supply line 17 and ground. The supply line 17 is connected to $B_1$− by a resistor R7. The emitter 16*e* is loaded by an emitter resistor R3. There is a collector resistor R4 between collector 16*c*** and supply line 17.

The output from the preamplifier 14 is taken across an emitter resistor R6 in the output of transistor stage 18 through a coupling capacitor C4 to a low frequency boost stage 20. The stage 20 has a pair of PNP transistors 22 and 24. The base **22*b* is connected to $B_1$− and ground by a pair of resistors R8 and R9. Between the base 24*b*** of the transistor 24 and $B_1$− is a voltage divider formed by resistors R12, R13. At the juncture of the resistors is a low frequency boost capacitor C7 connected to ground.

The emitter **24*e* supplies a gain control potentiometer 26, and the output from the potentiometer 26 is transmitted via a coupling capacitor C9 to a high frequency boost stage 30. The reference character R14 is assigned to the variable resistance section of potentiometer 26 across which the output is taken. The stage 30 is supplied by a direct current source $B_2$− and comprises three PNP transistors 32, 34 and 36. The transistor base 32*b* is coupled to $B_2$− by bias resistors R16 and R17. The transistor base 34*b*** through the coupling capacitor C10 is coupled to the transistor 32. Transistor 36 is directly coupled to transistor 34. Each of the transistors 32, 34 and 36 operates as a common-emitter amplifier stage.

High frequency boost is selectively provided by means of a switch 38 having a pair of contact blades **40*a*, 40*b*. The switch 38 serves to connect a pair of capacitors C12 and C14 between the emitters 32*e* and 34*e* and ground when the switch blades 40*a* and 40*b* are contacting terminals 42*a* and 42*b*, respectively. When the switch blades 40*a* and 40*b* are contacting terminals 44*a* and 44*b*, the capacitors C12 and C14 are out of the amplifier circuit. Alternatively either one of the switch blades 40*a* or 40*b***, may be connected individually with the associated emitter circuit to control the amount of high frequency boost.

An output terminal 46 for the circuit 10 is placed in circuit with emitter **36*e*** and the output from the amplifier is taken across load resistor R25.

The two stage preamplifier 14 constitutes a current amplifier with a low input impedance. The objective of obtaining good low frequency response is attained by using the current amplifier with the magnetic pickup head 12 having relatively low values of winding inductance (the head 12 thus being a low impedance pickup). The current output of the head 12 is relatively constant with frequency. The use of a current-type amplifier 14 eliminates the need for equalization in the mid-video frequency regions in order to obtain a flat frequency response. Equalization is used as indicated by FIG. 1 at both ends of the spectrum to compensate for the gap effect and other head losses due to hysteresis and eddy currents at the high frequencies, and rolloff at the low frequencies where the input impedance of the amplifier begins to determine the signal current flow, rather than the reactance of the head inductance.

In one circuit constructed in accordance with the present invention the frequency response of the amplifier 10 with the boost circuits C12 and C14 in and utilizing a playback head of a low impedance type such as one having an inductance of 3 millihenries is flat from 100 Hertz to 200 kiloHertz. Above 200 kiloHertz, the natural peaking of the head plus the high frequency boost provide about 20 decibels of boost that peaks at 1.7 MegaHertz. Utilizing this amplifier with a properly equalized recorded tape 13, the overall response achieved was 300 Hertz to 1.3 MegaHertz plus or minus 3 decibels with a signal to noise ratio of 28 decibels.

All the transistors used in the circuit are PNP 2N1177 except transistor 16, which is type 2N2411. The input impedance to transistor 16 is 30 to 50 ohms over the frequency range. The values of the circuit elements used are as follows:

| | | |
|---|---|---|
| Capacitors: | | |
| C1 | microfarads | 360 |
| C2 | do | 100 |
| C3 | do | 100 |
| C4 | do | 100 |
| C5 | do | 360 |
| C7 | do | .25 |
| C9 | do | 100 |
| C10 | do | 100 |
| C12 | picofarads* | 470 |
| C14 | do* | 220 |
| Resistors (kilohms): | | |
| R1 | | 27 |
| R2 | | 5.6 |
| R3 | | 1 |
| R4 | | 10 |
| R6 | | 1 |
| R7 | | .39 |
| R8 | | 68 |
| R9 | | 5.6 |
| R11 | | 1 |
| R12 | | 8.2 |
| R13 | | 1.8 |
| R16 | | 27 |
| R17 | | 6.8 |
| R18 | | 2.2 |
| R19 | | .82 |
| R21 | | 68 |
| R22 | | 12 |
| R23 | | 8.2 |
| R24 | | 2.7 |
| R25 | | 2.2 |
| Potentiometer | ohms | 26–2.000 |
| $B_1$— | volts | 9 |
| $B_2$— | do | 16½ |

*One picofarad=one micro-microfarad.

Summarizing, this playback system comprises a low impedance head driving a low input impedance amplifier. The voltage output from the head tends to increase linearly at 6 decibels per octave. An approximation for this increase is $$E_h \alpha n \frac{dv}{dt}$$

where $E_h$, is the voltage output of the head; $n$, the number of turns in the head; and $dv/dt$, the speed of the tape recording medium relative to the head. This system is analogous to a voltage source $E_h$ in series with an inductance.

The reactive impedance resulting from the series inductance increases linearly with increasing frequency with the voltage drop thereacross $E_L$ offsetting the rise in source voltage $E_h$ to provide an output $E_h+E_L$ as a function of frequency as indicated in FIG. 2. The combined curve $E_h+E_L$ is essentially flat in the midfrequency band of interest and is representative of the output from the first transistor stage 16. This, therefore, corresponds to a current responsive preamplifier in the playback system since the current response is constant with frequency as shown by curve $E_h+E_L$ in FIG. 2 whereas the voltage $E_h$ supplied to the head 12 tends to rise.

The unique feature of the amplifier 10 is its application as a means of obtaining flat frequency response for the reproduction of video pictures from a playback head 12 that has a pickup value. Good results have been achieved with head inductances as low as 2 millihenries.

The playback head 12 is followed by the amplifier 14 which is essentially a current amplifier and has a low input impedance. Good low frequency response is thereby obtained with relatively low values of winding inductance. The reason for this is that the current output, unlike the voltage output, is constant with frequency and does not fall off at the low frequency end until the reactance of the head is comparable to the input impedance of the amplifier, and below this point the current output of the head 12 begins to fall off at 6 decibels per octave. It can be seen that since the current output of the head 12 is constant with frequency, the use of a current-type amplifier will preclude the use of equalization in the midvideo frequency regions in order to obtain a flat frequency response; equalization is added, however, at both the high and low ends of the spectrum to compensate for the gap effect of the head, and the falloff in response at the low frequency end of the spectrum mentioned previously.

The low frequency compensation is obtained with one RC network, R12, R13, C7, having a time constant to properly correct for amplitude and phase deviations. The high frequency compensation may be added by a combination of two techiniques. One consists of the high frequency boost circuit 30, FIG. 1, in amplifier 10 provided by the RC networks, R19, R24, C12, C14, the other by LC peaking circuits at the output of the playback head (not shown). It has been found that a combination of both these methods provides adequate phase and amplitude equalization at high frequencies in order to obtain acceptable detail in the video pictures.

It is of interest to note that the LC peaking may be provided by the stray capacity and leakage inductance of the various windings in the playback head itself. This type of peaking was obtained in one of the playback heads used in a test setup. The peak in the response was obtained at 1.7 MegaHertz. This peak was found to be independent of amplifier input resistance or capacity as long as the resistance was in the low hundreds of ohms.

The actual input resistance in the playback amplifier 10 was approximately 30 to 50 ohms over the frequency band. Depending upon stray capacity and leakage inductance of a head to provide peaking at the correct frequencies may or may not be realistic; however, in any case, the peaking can be provided by external LC circuits. It has been found that obtaining peaking prior to the amplifier provides a better signal to noise ratio than if all peaking is done in the amplifier.

The simplest form of LC peaking can be provided by a shunt capacitor across the winding of the head together with a series inductance. Typical values are in the range of 200 picofarads and about 31 microhenries for peaking at 2 MegaHertz. It can be seen that since the head requires shunt capacity for this type of peaking, the stray capacity of the winding, leads and cable shielding can form part of this capacity and actually be beneficial instead of detrimental to the high frequency performance of the head.

Some additional benefits are derived from using an amplifier with low input impedance for video playback. Pickup of stray signals can be minimized by the use of shielded cable without being concerned with cable capacity limiting frequency response. In fact LC low pass filters have been added at the amplifier input to reduce radiofrequency pickup from high fields of local television stations without affecting high frequency response of the video playback system.

It is believed that refinements of the above techniques will eventually provide a playback signal that is flat from 100 Hertz to 2 MegaHertz with better than a 30 decibel signal to noise ratio.

Although minor modifications might be suggested by those versed in the art, it should be understood that I wish to embody within the scope of the patent warranted hereon all such embodiments as reasonably and properly come within the scope of my contribution to the art.

I claim as my invention:

1. A video playback amplifier with frequency compensation, for video signals having a frequency responsive of over 1

MegaHertz down to at least 300 Hertz, comprising a transistor current amplifier functioning as a preamplifier for such video signals, and employing a common-base configuration with the emitter of such transistor comprising the amplifier input electrode and the collector forming the amplifier output electrode, load resistance means connected to the emitter of said transistor and of such value that the input circuit so formed has an impedance on the order of 50 ohms, and a transducer head, having an inductive pickup winding, means operatively connecting said winding to the transistor input circuit with such winding operatively shunting said load resistance means, said transducer winding having an inductance of less than 10 mh. to provide an impedance which differs from the amplifier input impedance by an amount and in such direction that the inductive reactance of the transducer and input resistance of the amplifier will produce a current at the amplifier input which is substantially constant over at least the midvideo range, and said inductance being such that when taken with stray capacity and leakage inductance present the resulting LC peaking will be at a frequency at least in the upper portion of said last-mentioned range.